United States Patent [19]
Tseng

[11] Patent Number: 5,868,093
[45] Date of Patent: Feb. 9, 1999

[54] AMPHIBIOUS VEHICLE

[76] Inventor: An-Ping Tseng, 6F, No. 630-10, Ta You Road, Taoyuan, Taiwan

[21] Appl. No.: 816,025

[22] Filed: Mar. 11, 1997

[51] Int. Cl.$^6$ ...................................................... B63B 35/00
[52] U.S. Cl. ................................ 114/270; 440/88; 440/89
[58] Field of Search ................................ 114/270, 68, 69; 440/88, 89, 75

[56] References Cited

FOREIGN PATENT DOCUMENTS

| | | | |
|---|---|---|---|
| 492655 | 7/1992 | European Pat. Off. ................ | 114/270 |
| 1360853 | 7/1974 | United Kingdom ................... | 114/270 |

*Primary Examiner*—Ed L. Swinehart
*Attorney, Agent, or Firm*—Thomas R. Vygil

[57] ABSTRACT

An improved amphibious vehicle comprising a confined housing of a vehicle is provided. The confined housing is provided with a central connecting chamber under a cabinet adjacent to the central portion. An engine room and a floating cell are respectively provided in the front and rear, positions of the central connecting chamber. A thrust propeller is disposed under the tail portion of the floating cell. Characterized in that except the central connecting chamber, the engine room, and the floating cell which are indispensable components to the confined housing of the improved vehicle, the confined housing is further provided with a plurality of hollow cells among the confined housing other than those operating space required for maintenance conducted by the technician. Each of the hollow cells is filled with an imperious foam material to increase the floating capability such that the improved amphibious vehicle can readily float on the water. Wherein in order to balance the load distribution of the vehicle and to avoid a cooling fan is contacted with water, the radiator together with the cooling fan which is originally disposed within the engine room is disposed atop of the tail portion of the float cell. The radiator and the cooling fan is in communication with a ventilating channel to dissipate the heat generated within the engine room of the improved amphibious vehicle.

10 Claims, 6 Drawing Sheets

AMPHIBIOUS VEHICLE

FIELD OF THE INVENTION

The present invention relates to a vehicle, more particular, to an improved amphibious vehicle wherein the vehicle may drive on the dry land and the water surface without turn over or sink.

DESCRIPTION OF PRIOR ART

In the existing amphibious vehicle, it generally comprises an imperious body which is modified from its original body and chassis. Consequently, when the vehicle is put to the water, the water can be prevented from entering the body. On the other hand, this vehicle will be also provided with floating capability to sustain the gross weight of the vehicle. Furthermore, a propeller is disposed at the rear end of the vehicle such that this vehicle can sail on the water by the propelling of the propeller.

Even this existing and conventional amphibious vehicle may sail on water and drive on the land as a car and a boat, the amphibious vehicle shall have a housing like a boat because the confined body of the amphibious vehicle is used to carry the personnel and/or cargo. In light of this, the floating force is originated from the confined housing of the amphibious vehicle. Accordingly, if the personnel and/or the cargo are not evenly distributed or a leakage is occurred on the confined housing, the amphibious vehicle will be readily sunk.

Even this amphibious vehicle is equipped with an emergency pumping facility, this pumping facility may not work properly or even fail since the confined housing may readily be penetrated with water, consequently, the engine may readily stall resulted from penetrated water. If the penetrated water can not be quickly pump out from the confined housing, the amphibious will ultimately sink.

SUMMARY OF THE INVENTION

It is the object of this invention to provide an amphibious vehicle wherein the confined housing is provided with a plurality of hollow chambers and imperious foam material. By this arrangement, the amphibious vehicle is provided with great floating force while the accumulated water within the confined housing can be largely reduced. In light of this, even the amphibious vehicle is anchored on the water with the confined housing is filled with water, the amphibious vehicle can be well supported without sinking down.

It is still the object of this invention to provide an improved amphibious vehicle wherein a pumping pipe is disposed and extended to the engine room from the thrust propeller. By this arrangement, the accumulated water at the engine room can be suitably pump to outside of the amphibious vehicle by the operation of the thrust propeller. In light of this, the amphibious vehicle can be properly driven along the water way while the amphibious vehicle can be provided with the highest floating force as the accumulated water is completely pumped out.

It is still the object of this invention to provide an improved amphibious vehicle wherein a ventilating duct is disposed between the engine room and the radiator having a cooling fan which is disposed at the rear end the vehicle. Accordingly, the heat generated within the engine room is well ventilated and the weight of the vehicle is well distributed.

BRIEF DESCRIPTION OF DRAWINGS

In order that the present invention may more readily be understood the following description is given, merely by way of example with reference to the accompanying drawings, in which.

DETAILED DESCRIPTION OF PREFERRED EMBODIMENT

Figure 1:
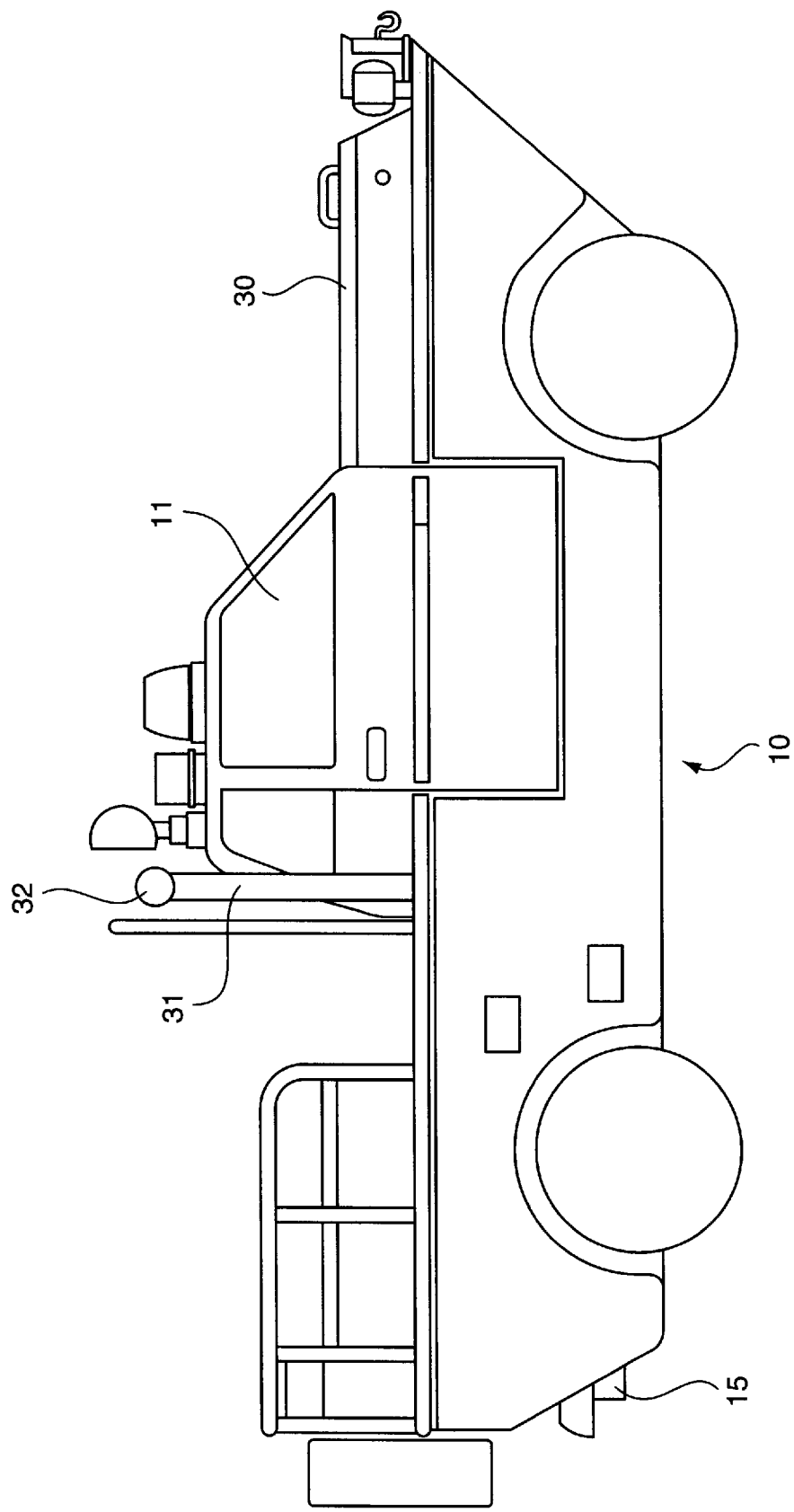
FIG. 1 is a side elevational view of the improved amphibious vehicle made according to the present invention.

Referring to Figures, the improved amphibious vehicle made according to the present invention generally comprises a confined housing 10 of a vehicle. The confined housing 10 is provided with a central connecting chamber 12 under the cabinet 11 adjacent to the central portion. An engine room 13 and a floating cell 14 are respectively provided at the front and rear positions of the central connecting chamber 12. A thrust propeller 15 is disposed under the tail portion of the floating cell 14. The thrust propeller 15 is connected with a selecting device 17 by means of a propshaft 16. The selecting device 17 is disposed in the front portion of the thrust propeller 15. The selecting device 17 is connected with the engine 20 disposed within the engine room 19 via a main propshaft 18 disposed within the central connecting chamber 12 at one hand. The selecting device 17 is also connected with a driven shaft 22 under its rear side, i.e., under the propshaft 16 shown in FIG. 3 for driving an axle 22a for a pair the rear wheels. By the provision of the selecting device 17, the output of the engine 20 can be suitably selected to transmit to the driven shaft 22 to drive the wheels when the vehicle drives on a land, and to the propshaft 16 when the vehicle sails on the water way.

Figure 3:
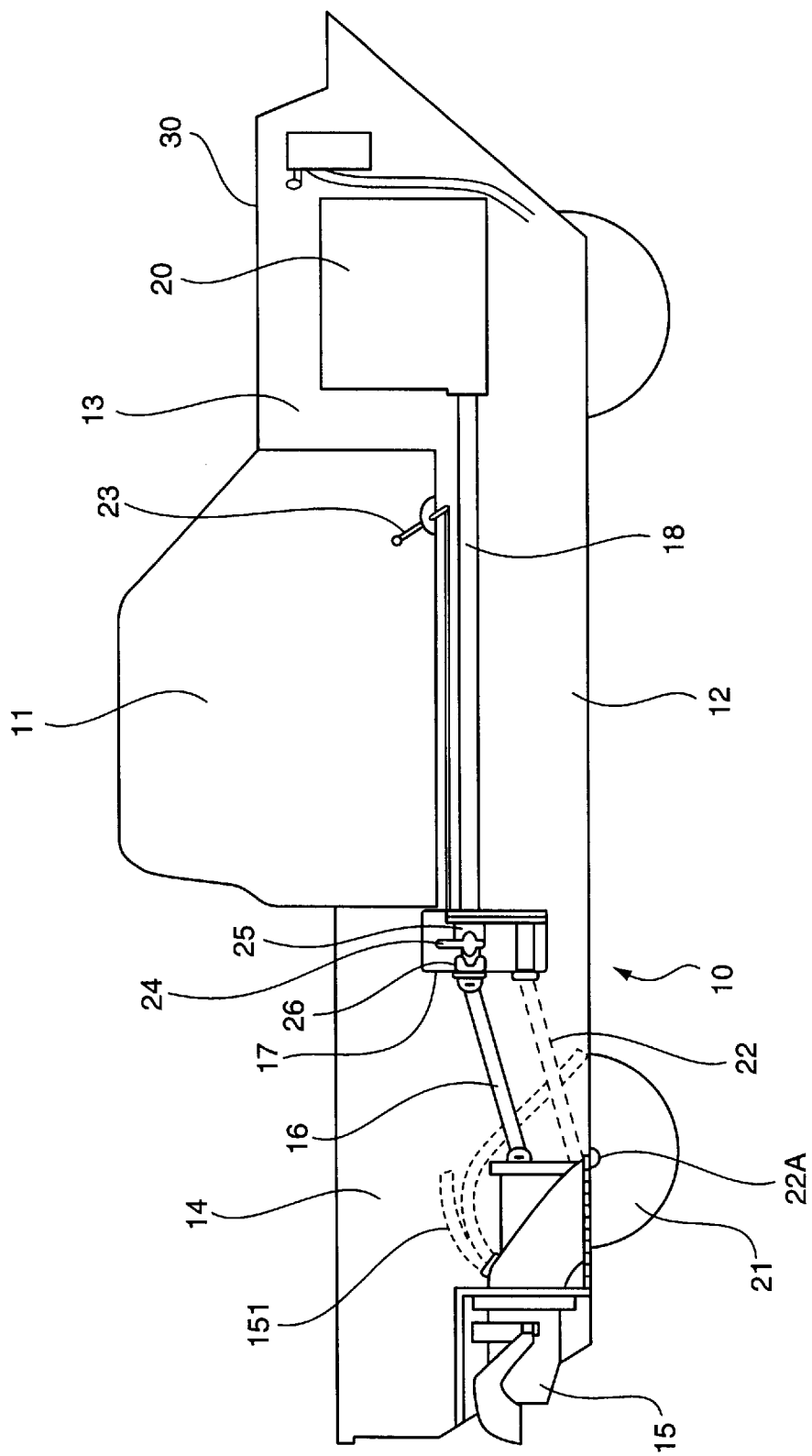
FIG. 3 is a schematic illustration of the transmission system of the improved amphibious vehicle made according to the present invention.

The operation of the selecting device 17 is shown in FIG. 3. The selecting device 17 is provided with a pulling rod 23 within the engine room 11 to actuate a clutch 24 disposed within the selecting device 17. The clutch 24 is rotated simultaneously with the main propshaft 18 and can be moved forward or backward. The clutch 24 is further provided with-an-engaging devices 25 and 26 corresponding to the driven shaft 22 and the propshaft 16 respectively in the front and rear positions. By the engagement between the clutch 24 and the engaging device 25 or 26, the amphibious vehicle can drive on the land by means of the wheels or sail on the water way by means of thrust propeller 15.

Figure 4:
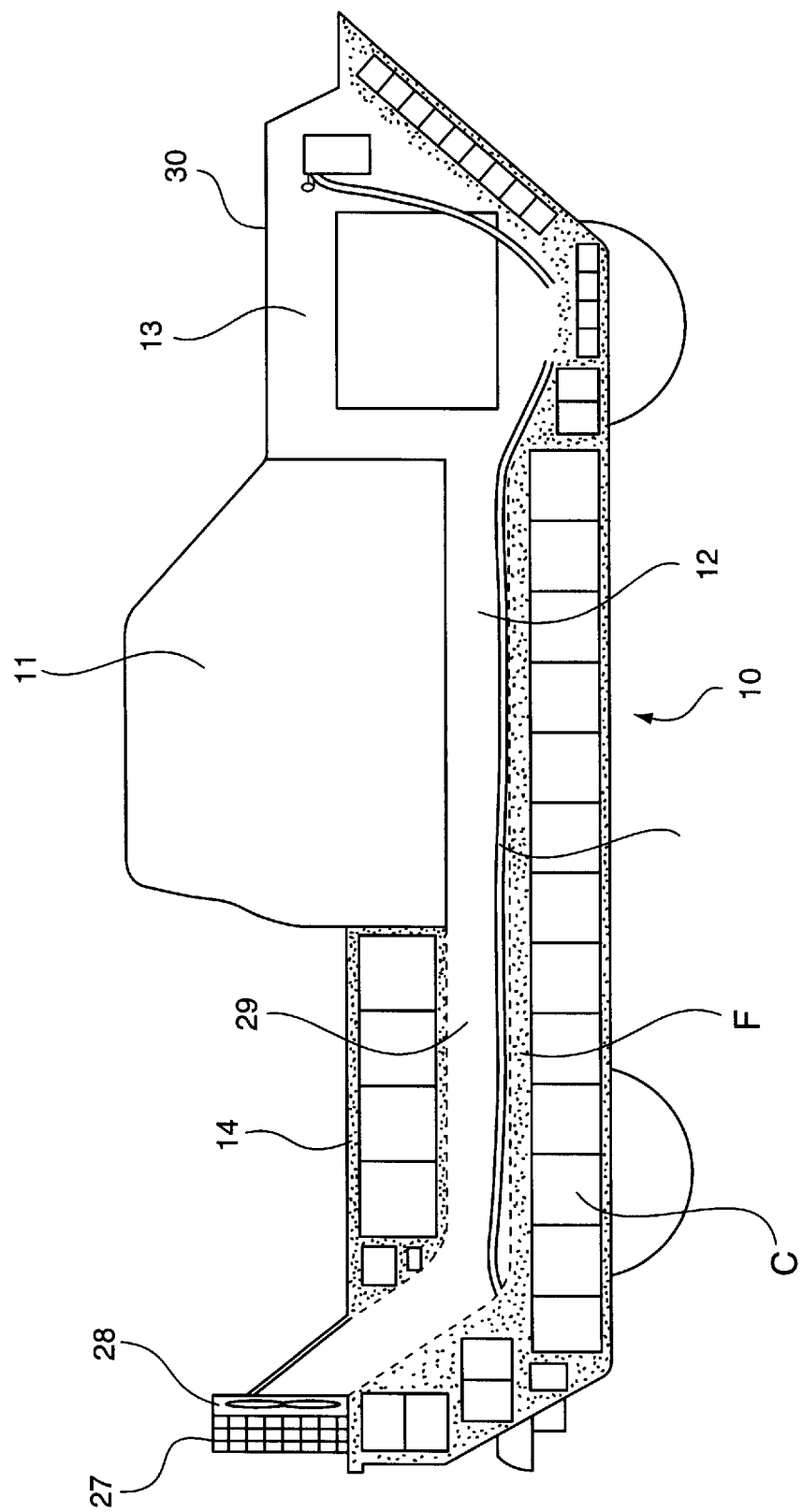
FIG. 4 is a schematic illustration of the inner configuration of the amphibious vehicle made according to the present invention.

Referring to FIG. 4, except the central connecting chamber 12, the engine room 13, and the floating cell 14 which are indispensable components to the confined housing 10 of the improved vehicle, the confined housing 10 is further provided with a plurality of hollow cells C among the confined housing 10 other than those operating space required for maintenance conducted by the technician. Each of the hollow cells C is filled with an imperious foam material F to reduce the potential space for accumulating penetrated water. By this arrangement, not only will the possibility of leaking water is considerably reduced, the amphibious vehicle is also provided with a maximum floating force. Consequently, the overall or gross weight of the amphibious vehicle will not be considerably increased by penetrated and accumulated water. In light of this, even the engine is stalled and the amphibious vehicle is floated on the water, the vehicle will not sink into the water since the floating force provided by the foam material F is greater than the net weight of the vehicle.

Figure 5:
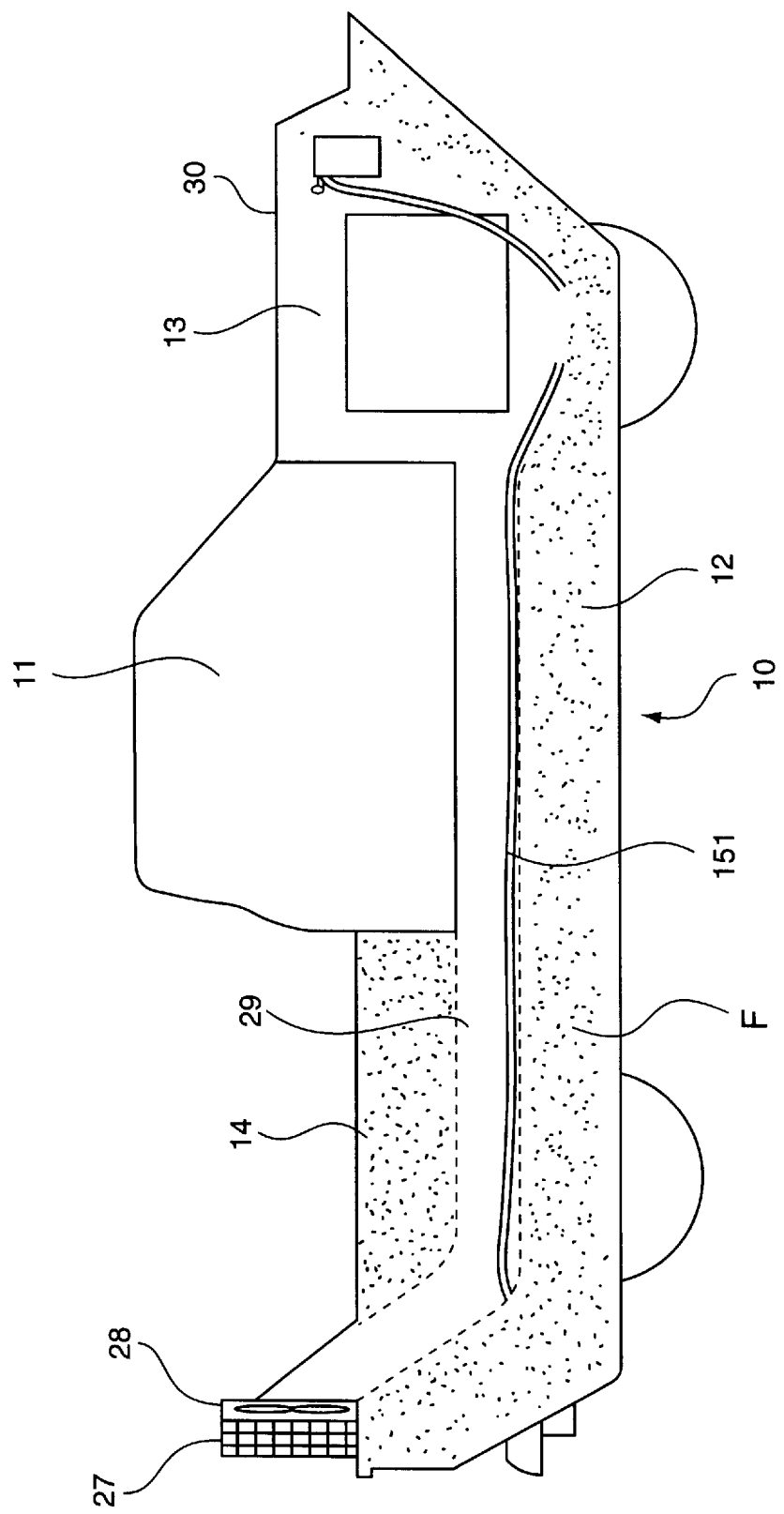
FIG. 5 is still a schematic illustration of the inner configuration of another embodiment of the amphibious vehicle made according to the present invention.

Referring to FIG. 5, another embodiment of the present invention has been disclosed. In this embodiment, the hollow chamber C is completely replaced by the imperious foam material F such that the redundant spaces are filled with foam material. Consequently, the penetrated water can be prevented from accumulating in the confined housing 10. On the other hand, the foam material F is inherited with excellent floating capability such that the amphibious vehicle can be provided with excellent floating capability on the water.

Furthermore, in order to balance the weight of the vehicle and prevent the cooling fan being in contact with the water, the radiator 27 together with the cooling fan 28 is disposed at the top of the rear end of the floating cell 14 instead of in the engine room 13. In order to dissipate the heat generated within the engine room 13, a circulating pipe (not shown) is disposed between the engine 20 and the radiator 27. Besides, as shown in FIGS. 4 and 5, a ventilating channel 29 is disposed from the engine room 13 through the central connecting chamber 12, the floating cell 13 and to the cooling fan 28. The engine room 13 is covered by a lid 30. A ventilating slot 133 (134) is formed between the lid 30 and the side wall 131 (132) of the engine room 13. By this arrangement, when the cooling fan sucks out the heated air within the engine room 13 together with the ventilating slots 133, 134, the engine room 13 can be well ventilated at one hand. On the other hand, the radiator 27 can also be cooled down.

Figure 6:
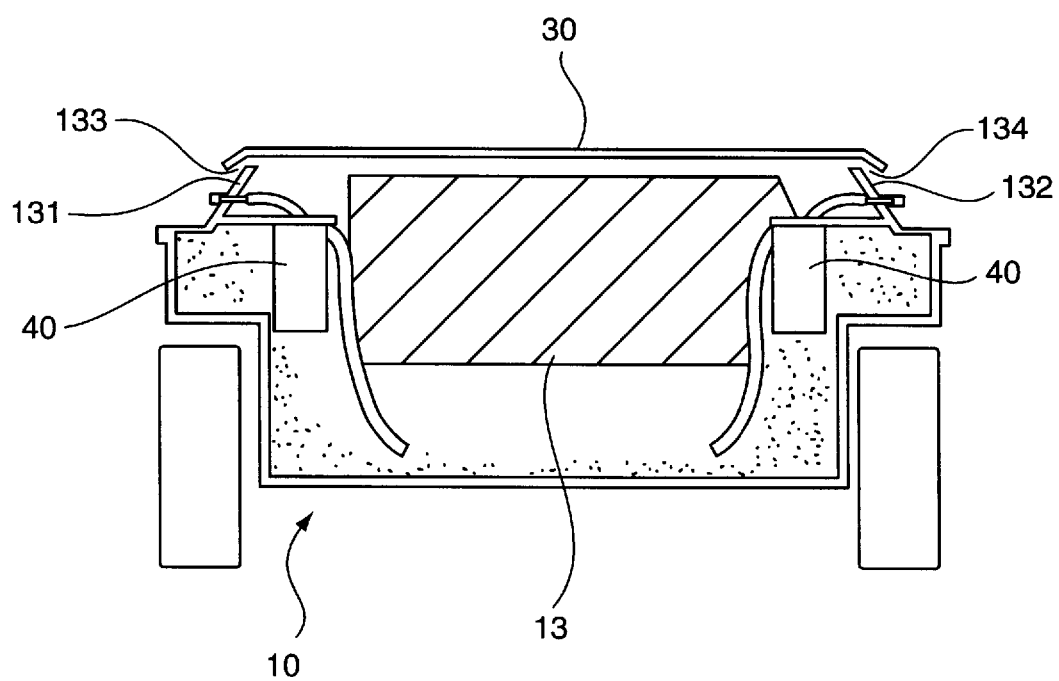
FIG. 6 is a schematic illustration of the engine room of the amphibious vehicle made according to the present invention.

Furthermore, the engine room 13 of the improved amphibious vehicle is also provided with imperious foam material F. However, the engine room 13 is disposed with an engine 20 which provided the main power of the vehicle and which shall be maintained periodically. Accordingly, there is a comparatively large space required for maintenance within the engine room 13. In order to reduce the possibility of accumulating water within the engine room 13, one or more than one set of pump 40 can be disposed within the engine room 13 to pump out the accumulated water, as shown in FIGS. 4 to 6. The thrust propeller 15 is also provided with a pumping pipe 151 which is interconnected to the engine room 13, as shown in FIGS. 3 and 4. Accordingly, when the thrust propeller 15 works functionally, it also provides a pumping effect to the engine room such that the accumulated water within the engine room 13 can be drained out during the operation of the thrust propeller 15.

Figure 2:
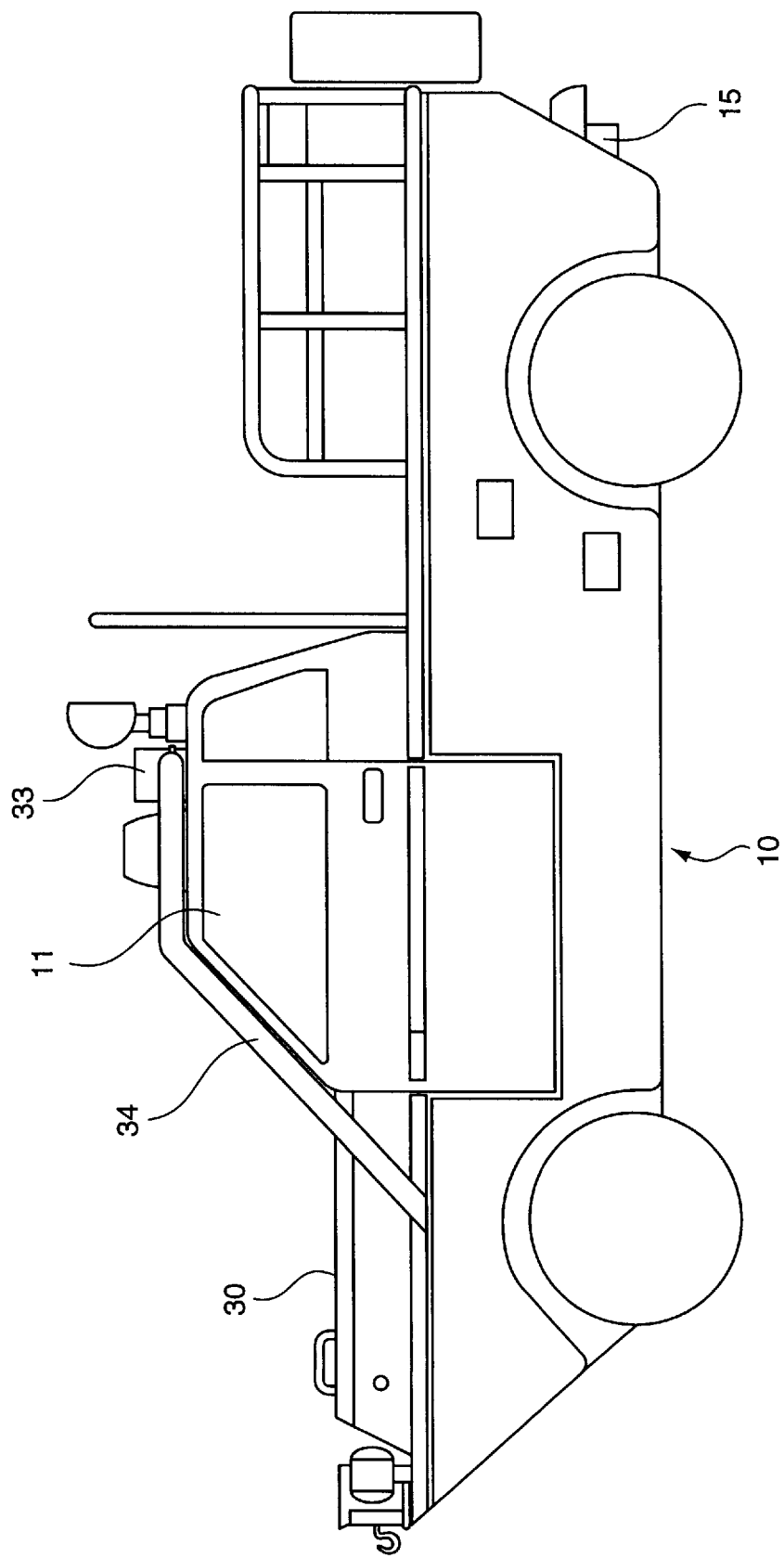
FIG. 2 is a still a side elevational view of the improved amphibious vehicle made according to the present invention.

In order to prevent the engine 20 of the amphibious vehicle being stalled resulted from penetrated water from the exhausting pipe 31, the opening 32 of the exhausting pipe 31 is elevated to a suitable height, as shown in FIG. 1. On the other hand, in order to prevent the air filter 33 of the engine 20 being wetted by penetrated water, the air filter 33 is connected with a suitable pipe 34 such that the air filter 33 is disposed atop of the cabinet 11, as shown in FIG. 2.

Because the floating capability of the amphibious vehicle is originated from elaborate design, accordingly, in the in the event the confined housing 10 is filled with water as the pumping system is failed, the amphibious vehicle can still float on the water without sinking down. On the other hand, if the tides are high enough to penetrate into the cabinet 11, because the amphibious vehicle does not have redundant space and the cabinet 11 is located in the highest position, consequently, when the door of the cabinet is opened, the accumulated water may readily drain out and the amphibious vehicle can be prevented from sinking down.

From the forgoing description, the inner space of the confined housing 10 of the amphibious vehicle is filled with different hollow chambers and imperious foam material, the amphibious vehicle is inherited with floating capability such that the amphibious vehicle will never sink down. On the other hand, the confined housing of the amphibious vehicle is also provided with pumping device to drain out the water. Furthermore, the radiator and the cooling fan are suitably disposed. In light of this, the amphibious vehicle can properly drive on the road and sail on the water with highest safety. This is all resulted from elaborate design and improvement.

I claim:

1. An improved amphibious vehicle comprising a confined housing, said confined housing being provided with a central connecting chamber under a cabinet adjacent to a central portion, an engine room and a floating cell being, respectively, provided in front and rear portions of said central connecting chamber, a thrust propeller being disposed under a rear end of said floating cell, a pair of front wheels and a pair of rear wheels mounted to said vehicle; said thrust propeller being connected with a selecting device by a thrust propeller shaft, and said selecting device being disposed in front of said thrust propeller shaft, said selecting device being connected with an engine disposed within said engine room via a main propshaft disposed within said central connecting chamber, said selecting device also being connected with a driven shaft which in turn is connected to said rear wheels of said vehicle, wherein, by the provision of said selecting device, the output of said engine can be suitably selected to transmit to the driven shaft to drive the wheels when the vehicle drives on land, and to said propshaft when the vehicle sails on the water way; a radiator; and a cooling fan; wherein, except for said central connecting chamber, said engine room, and said floating cell, which are indispensable components to said confined housing of said improved vehicle, said confined housing has a plurality of hollow cells C in said confined housing other than those operating spaces required for maintenance, each of said hollow cells being filled with a water impervious foam material to increase the floating capability such that said improved amphibious vehicle can readily float on the water; wherein in order to balance the load distribution of said vehicle and to avoid said cooling fan being contacted with water, said radiator together with the cooing fan being disposed atop of the rear end of said float cell and said radiator and said cooling fan being in communication with a ventilating channel to dissipate the heat generated within said engine room of said improved amphibious vehicle.

2. An improved amphibious vehicle as recited in claim 1, wherein an opening of an exhaust pipe is elevated and an air filter is disposed atop of said cabinet and connected by a suitable pipe to said engine such that the engine can be prevented from being installed as a result of contact with water.

3. An improved amphibious vehicle as recited in claim 1, wherein said engine room is covered by a lid, a ventilating slot is formed between the lid and the top of the side wall of the engine room to increase the cooling to said engine.

4. An improved amphibious vehicle as recited in claim 1, wherein said engine room further comprises at least one pumping system to drain out possible accumulated water.

5. An improved amphibious vehicle as recited in claim 1, wherein said thrust propeller is further provided with a pumping pipe which is interconnected to the engine room, so that, when said thrust propeller works functionally, a pumping engine room can be drained out during the operation of the thrust propeller.

6. An improved amphibious vehicle comprising a confined housing, said confined housing being provided with a central connecting chamber under a cabinet adjacent to a central portion, an engine room and floating means being, respectfully, provided in front and rear portions of said central connecting chamber, a thrust propeller being disposed under a rear end of said floating means, a pair of front wheels and a pair of rear wheels mounted to said vehicle; said thrust propeller being connected with a selecting device by a thrust propeller shaft, and said selecting device being disposed in front of said thrust propeller shaft, said selecting device being connected with an engine disposed within said engine room via a main prop shaft, said selecting device also being connected with a driven shaft which is in turn connected to said rear wheels of said vehicle; wherein by the provision of said selecting device, the output of said engine can be suitably selected to transmit to said driven shaft to drive the wheels when the vehicle drives on land and to said prop shaft when said vehicle sails on the water; a radiator; a cooling fan; wherein, except for said central connecting chamber, said engine room, and said floating means which are indispensable components to said confined housing of said improved vehicle, said floating means being defined by a water impervious foam material to increase the floating capability such that said improved amphibious vehicle can really float on the water; and wherein in order to balance the load distribution of said vehicle and to avoid said cooling fan being contacted with water, said radiator together with said cooling fan being disposed on top of the rear end of said floating means, and said radiator and said cooling fan being in communication with the ventilating channel to dissipate the heat generated within said engine room of said improved amphibious vehicle.

7. An improved amphibious vehicle as recited in claim 2 wherein an opening of an exhaust pipe is elevated and a air filter is disposed on top of said cabinet and connected by a single pipe to said engine such that the engine can be prevented from being stalled as result of contact with water.

8. An improved amphibious vehicle as recited in claim 2 wherein said engine room is covered by a lid, a ventilating slot is formed between said lid and the top of the side wall of the engine room to increase the cooling to said engine.

9. An improved amphibious vehicle as recited in claim 2 wherein said engine room further comprises at least one pumping system to drain out possible accumulating water.

10. An improved amphibious vehicle as recited in claim 2 wherein said thrust propeller is further provided with a pumping pipe which is interconnected to the engine room so that when said thrust propeller works functionally, a pumping engine room can be drained out during the operation of the thrust propeller.

\* \* \* \* \*